United States Patent
Zuo et al.

(10) Patent No.: US 10,416,513 B2
(45) Date of Patent: Sep. 17, 2019

(54) LIQUID CRYSTAL DISPLAY PANEL AND LIQUID CRYSTAL DISPLAY DEVICE

(71) Applicant: WUHAN CHINA STAR OPTOELECTRONICS TECHNOLOGY CO., LTD., Wuhan (CN)

(72) Inventors: Qingcheng Zuo, Wuhan (CN); Xiaoling Yuan, Wuhan (CN)

(73) Assignee: WUHAN CHINA STAR OPTOELECTRONICS TECHNOLOGY CO., LTD, Wuhan (CN)

( * ) Notice: Subject to any disclaimer, the term of this patent is extended or adjusted under 35 U.S.C. 154(b) by 34 days.

(21) Appl. No.: 15/565,745

(22) PCT Filed: May 3, 2017

(86) PCT No.: PCT/CN2017/082809
§ 371 (c)(1),
(2) Date: Oct. 11, 2017

(87) PCT Pub. No.: WO2018/176562
PCT Pub. Date: Oct. 4, 2018

(65) Prior Publication Data
US 2018/0314119 A1    Nov. 1, 2018

(30) Foreign Application Priority Data
Mar. 29, 2017   (CN) .......................... 2017 1 0198541

(51) Int. Cl.
*G09G 3/00* (2006.01)
*G02F 1/1362* (2006.01)
(Continued)

(52) U.S. Cl.
CPC ...... *G02F 1/136204* (2013.01); *G02F 1/1345* (2013.01); *G02F 1/13452* (2013.01);
(Continued)

(58) Field of Classification Search
CPC ............. G02F 1/136204; G02F 1/1345; G02F 1/13454; G02F 1/136286; G02F 1/13452;
(Continued)

(56) References Cited

U.S. PATENT DOCUMENTS

| 10,203,574 B2 * | 2/2019 | Wang .................... G02F 1/1303 |
| 2007/0002033 A1 * | 1/2007 | Komatsu ............... G09G 3/3688 345/204 |

(Continued)

FOREIGN PATENT DOCUMENTS

| CN | 101097389 A | 1/2008 |
| CN | 103871341 A | 6/2014 |

*Primary Examiner* — Ibrahim A Khan
(74) *Attorney, Agent, or Firm* — Mark M. Friedman

(57) ABSTRACT

This disclosure provides a liquid crystal display panel where a display area is divided into a plurality of areas to arrange driver chip, fan-out line, multiplexer line, detection circuit and protection circuit. A detection circuit and a protection circuit are disposed in a same area, making the protection circuit share thin-film transistors with the detection circuit.

11 Claims, 2 Drawing Sheets

(51) Int. Cl.
  *G09G 3/36* (2006.01)
  *G02F 1/1345* (2006.01)
(52) U.S. Cl.
  CPC .... *G02F 1/13454* (2013.01); *G02F 1/136286* (2013.01); *G09G 3/006* (2013.01); *G09G 3/3688* (2013.01); *G02F 2001/136254* (2013.01); *G09G 2300/0426* (2013.01); *G09G 2330/04* (2013.01); *G09G 2330/12* (2013.01)
(58) Field of Classification Search
  CPC ...... G02F 2001/136254; G09G 3/3688; G09G 3/006; G09G 2330/12; G09G 2300/0426; G09G 2330/04
  See application file for complete search history.

(56) References Cited

U.S. PATENT DOCUMENTS

| | | | |
|---|---|---|---|
| 2007/0013634 A1* | 1/2007 | Saiki | G09G 3/3674 345/98 |
| 2007/0030408 A1* | 2/2007 | Lin | G02F 1/136204 349/40 |
| 2008/0001885 A1 | 1/2008 | Yanagisawa et al. | |
| 2014/0009375 A1* | 1/2014 | Tsai | G09G 3/36 345/98 |
| 2016/0035304 A1* | 2/2016 | Zheng | G02F 1/136286 345/211 |
| 2016/0240120 A1 | 8/2016 | Du et al. | |
| 2017/0179160 A1* | 6/2017 | Takahashi | H01L 27/1225 |
| 2017/0221440 A1* | 8/2017 | Chen | G09G 3/3677 |
| 2018/0075790 A1* | 3/2018 | Abernathy | G09G 3/006 |

* cited by examiner

LIQUID CRYSTAL DISPLAY PANEL AND LIQUID CRYSTAL DISPLAY DEVICE

BACKGROUND OF THE INVENTION

1. Field of the Invention

The present disclosure relates to the field of liquid crystal displays, and more particularly to a liquid crystal display panel and a liquid crystal display device comprising the liquid crystal display panel.

2. Description of the Prior Art

Liquid crystal display devices having a thin body, reduced power consumption, and no radiation have been used widely in devices such as mobile phones, personal digit assistants, digital cameras, computer screens, or laptop screens.

As shown in FIG. 1, a structural diagram of a bottom border of an existing liquid crystal display panel is shown. A panel detect circuit 103 is disposed between fan-out lines 102 and multiplexer lines 104. A width (A) of the bottom border is at a distance (B) from an edge of the liquid crystal display to a driver chip+a width (D) of the fan-out line 102+a width (E) of the panel detect circuit 103+distance (F) from a bottom border of the panel detect circuit 103 to a top border of a display area 106. The distance (F) from the bottom border of the panel detect circuit 103 to the top border of the display area 106 comprises a width of a protection circuit 105.

As shown in FIG. 2, a detection circuit diagram of existing liquid crystal display panel is shown. Source electrodes (or drain electrodes) from a thin-film transistor T1, a thin-film transistor T3 to a thin-film transistor T(2N−1) of a panel detect circuit 206 are connected to an odd detect signal line. Source electrodes (or drain electrodes) from a thin-film transistor T2, a thin-film transistor T4 to a thin-film transistor T(2N) of the panel detect circuit 206 are connected to an even detect signal line. Gate electrodes of the thin-film transistor from T1 to T(2N) are connected to a detection control line. The drain electrodes (or the source electrodes) from the thin-film transistor T1 to the thin-film transistor T(2N) are connected to a bottom border of driver chip 202 by a fan-out line 201 and connected to a multiplexer line 203 too.

An output end of the multiplexer line 203 is connected to a protection circuit 204 used for electrostatic protection of the liquid crystal display panel, and the protection circuit 204 is connected to normal display pixels 205.

When testing the panel, a turn on voltage is input to the detection control lines and the panel is charged by the odd detection control lines and the even detection control lines before bonding the driver chip. The detection control lines are closed and the panel is charged by data lines after bonding the driver chip.

In summary, there are too many functional modules in the existing liquid crystal display panel, making the bottom border too wide and making narrow borders of the liquid crystal display panel to be unrealized.

SUMMARY OF THE INVENTION

The present disclosure provides a liquid crystal display panel simplifies its bottom border to resolve a problem that a complex structure of existing liquid crystal display panel non-display area makes narrow borders of the liquid crystal display panel to be unrealized.

To solve the above problem, the present disclosure provides a technical scheme as follows:

The present disclosure provides a liquid crystal display panel, the liquid crystal display panel comprises a display area and a non-display area around the display area, a drive unit is disposed on the non-display area, and the drive unit is disposed on an underside of the display area, the drive unit comprising:

a driver chip configured to input a voltage to a plurality of pixels;

a plurality of fan-out lines, leading out from an output end of the driver chip, and extending to the display area to connect to data lines connected to each pixel, configured to transfer drive voltages;

a plurality of multiplexer lines, each of the multiplexer lines connected to the fan-out lines, and configured to turn the fan-out lines on and off;

a detection circuit comprising at least one detection signal line and one detection control line, the detecting circuit configured to detect a drive circuit of the liquid crystal display panel; the detection control line connected to a plurality of thin-film transistors;

a protection circuit arranged close to the display area, the protection circuit configured to prevent static electricity of the liquid crystal panel, the protection circuit comprising a scan line connected to a plurality of thin-film transistors;

wherein an area of the non-display area is divided into a plurality of areas along a width direction of the non-display area to set the driver chip, the fan-out lines, the multiplexer lines, the detection circuit and the protection circuit;

wherein the detection circuit and the protection circuit are disposed on a same area, the detection control line of the detection circuit is connected to the scan line by a thin-film transistor, making the protection circuit share the thin-film transistors with the detection circuit.

According to a preferred embodiment of the present disclosure, an area between an outer border of the non-display area to an inner border of the non-display area is divided into a first area, a second area, a third area and a fourth area, the driver chip is disposed on the first area, the fan-out lines are disposed on the second area, the multiplexer lines are disposed on the third area, the detection circuit and the protection circuit are disposed on the fourth area;

wherein the first area is arranged close to the edge of the non-display area, and the fourth area is arranged close to the edge of the display area.

According to a preferred embodiment of the present disclosure, a first detection signal line, a second detection signal line, a detection control line, a scan line and a plurality of data lines are disposed on the fourth area, the data lines leading out from the third area, and extending to the display area to connect to the corresponding pixel;

wherein a signal input end of the scan line is connected to a first thin-film transistor, a gate electrode of the first thin-film transistor is connected to the detection control line, a source electrode of the first thin-film transistor receives a scan signal; a drain electrode of the first thin-film transistor is connected to the scan line;

wherein the scan line is connected to a plurality of second thin-film transistors, a gate electrode of the second thin-film transistor is connected to the scan line, a source electrode of the (2n−1)th second thin-film transistor is connected to the first detection signal line, a source electrode of the (2n)th second thin-film transistor is connected to the second detection signal line, wherein n is a positive integer, a drain electrode of the second thin-film transistor is connected to the corresponding data line.

According to a preferred embodiment of the present disclosure, a length-width ratio of a channel of the second thin transistor is greater than a length-width ratio of a channel of thin-film transistor in the display area.

According to a preferred embodiment of the present disclosure, when testing the panel, an input voltage V1 of the detection control line is greater than a sum of a scan signal voltage V2 and a threshold voltage Vth of the first thin-film transistor.

The present disclosure provides another liquid crystal display panel, the liquid crystal display panel comprises a display area and a non-display area around the display area, a drive unit is disposed on the non-display area;

the drive unit comprising:

a driver chip configured to input a voltage to a plurality of pixels;

a plurality of fan-out lines, leading out from an output end of the driver chip, and extending to the display area to connect to data lines connected to each pixel, configured to transfer drive voltages;

a plurality of multiplexer lines, each of the multiplexer lines connected to the fan-out lines, and configured to turn the fan-out lines on and off;

a detection circuit comprising at least one detection signal line and one detection control line, the detecting circuit configured to detect a drive circuit of the liquid crystal display panel; the detection control line connected to a plurality of thin-film transistors;

a protection circuit arranged close to the display area, the protection circuit configured to prevent static electricity of the liquid crystal panel, the protection circuit comprising a scan line connected to a plurality of thin-film transistors;

wherein an area of the non-display area is divided into a plurality of areas along a width direction of the non-display area to set the driver chip, the fan-out lines, the multiplexer lines, the detection circuit and the protection circuit;

wherein the detection circuit and the protection circuit are disposed on a same area, the detection control line of the detection circuit is connected to the scan line by a thin-film transistor, making the protection circuit share the thin-film transistors with the detection circuit.

According to a preferred embodiment of the present disclosure, an area between an outer border of the non-display area to an inner border of the non-display area is divided into a first area, a second area, a third area and a fourth area, the driver chip is disposed on the first area, the fan-out lines are disposed on the second area, the multiplexer lines are disposed on the third area, the detection circuit and the protection circuit are disposed on the fourth area;

wherein the first area is arranged close to the edge of the non-display area, and the fourth area is arranged close to the edge of the display area.

According to a preferred embodiment of the present disclosure, a first detection signal line, a second detection signal line, a detection control line, a scan line and a plurality of data lines are disposed on the fourth area, the data lines leading out from the third area, and extending to the display area to connect to the corresponding pixel;

wherein a signal input end of the scan line is connected to a first thin-film transistor, a gate electrode of the first thin-film transistor is connected to the detection control line, a source electrode of the first thin-film transistor receives a scan signal; a drain electrode of the first thin-film transistor is connected to the scan line;

wherein the scan line is connected to a plurality of second thin-film transistors, a gate electrode of the second thin-film transistor is connected to the scan line, a source electrode of the (2n−1)th second thin-film transistor is connected to the first detection signal line, a source electrode of the (2n)th second thin-film transistor is connected to the second detection signal line, wherein n is a positive integer, a drain electrode of the second thin-film transistor is connected to the corresponding data line.

According to a preferred embodiment of the present disclosure, a length-width ratio of a channel of the second thin transistor is greater than a length-width ratio of a channel of thin-film transistor in the display area.

According to a preferred embodiment of the present disclosure, when testing the panel, an input voltage V1 of the detection control line is greater than a sum of a scan signal voltage V2 and a threshold voltage Vth of the first thin transistor.

The present disclosure provides a liquid crystal display device, comprising:

a liquid crystal display panel;

a backlight module, arranged opposite to the liquid crystal display panel, providing backlight for the liquid crystal display panel.

wherein the liquid crystal display panel comprises a display area and a non-display area around the display area, a drive unit is disposed on the non-display area;

the drive unit comprising:

a driver chip configured to input a voltage to a plurality of pixels;

a plurality of fan-out lines, leading out from an output end of the driver chip, and extending to the display area to connect to data lines connected to each pixel, configured to transfer drive voltages;

a plurality of multiplexer lines, each of the multiplexer lines connected to the fan-out lines, and configured to turn the fan-out lines on and off;

a detection circuit comprising at least one detection signal line and one detection control line, the detecting circuit configured to detect a drive circuit of the liquid crystal display panel; the detection control line connected to a plurality of thin-film transistors;

a protection circuit arranged close to the display area, the protection circuit configured to prevent static electricity of the liquid crystal panel, the protection circuit comprising a scan line connected to a plurality of thin-film transistors;

wherein an area of the non-display area is divided into a plurality of areas along a width direction of the non-display area to set the driver chip, the fan-out lines, the multiplexer lines, the detection circuit and the protection circuit;

wherein the detection circuit and the protection circuit are disposed on a same area, the detection control line of the detection circuit is connected to the scan line by a thin-film transistor, making the protection circuit share the thin-film transistors with the detection circuit.

According to a preferred embodiment of the present disclosure, an area between an outer border of the non-display area to an inner border of the non-display area is divided into a first area, a second area, a third area and a fourth area, the driver chip is disposed on the first area, the fan-out lines are disposed on the second area, the multiplexer lines are disposed on the third area, the detection circuit and the protection circuit are disposed on the fourth area;

wherein the first area is arranged close to the edge of the non-display area, and the fourth area is arranged close to the edge of the display area.

According to a preferred embodiment of the present disclosure, a length-width ratio of a channel of the second thin transistor is greater than a length-width ratio of a channel of thin-film transistor in the display area.

Compare with to the existing liquid crystal display panel, the present disclosure combines the detection circuit with the protection circuit and dispose them in a same area, reducing the width of the non-display area, realizing the narrow borders of the liquid crystal display panel.

BRIEF DESCRIPTION OF THE DRAWINGS

In order to more clearly illustrate the technical solution in the present disclosure or in the prior art, the following will illustrate the figures used for describing the embodiments or the prior art. It is obvious that the following figures are only some embodiments of the present disclosure. For a person of ordinary skill in the art, without creative effort, other figures can also be obtained according to these figures.

DETAILED DESCRIPTION OF THE PREFERRED EMBODIMENTS

The following description of every embodiment with reference to the accompanying drawings is used to exemplify a specific embodiment which may be carried out in the present disclosure. Directional terms mentioned in the present disclosure, such as "top", "bottom", "front", "back", "left", "right", "inside", "outside", "side" etc., are only used with reference to the orientation of the accompanying drawings. Therefore, the used directional terms are intended to illustrate, but not to limit, the present disclosure. In the accompanying drawings, units with similar structures are indicated by the same sign.

The present disclosure can resolve the problem that too many functional modules of the bottom border make narrow borders of a liquid crystal display panel to be unrealized.

The present disclosure provides a liquid crystal display panel, the liquid crystal display panel comprises a display area and a non-display area around the display area, a drive unit is disposed on the non-display area; the drive unit comprising: a driver chip configured to input a voltage to a plurality of pixels; a plurality of fan-out lines, leading out from an output end of the driver chip, and extending to the display area to connect to data lines connected to each pixel, configured to transfer drive voltages; a plurality of multiplexer lines, each of the multiplexer lines connected to the fan-out lines, and configured to turn the fan-out lines on and off; a detection circuit comprising at least one detection signal line and one detection control line, the detecting circuit configured to detect a drive circuit of the liquid crystal display panel; the detection control line connected to a plurality of thin-film transistors; a protection circuit arranged close to the display area, the protection circuit configured to prevent static electricity of the liquid crystal display panel, the protection circuit comprising a scan line connected to a plurality of thin-film transistors; wherein an area of the non-display area is divided into a plurality of areas along a width direction of the non-display area to set the driver chip, the fan-out lines, the multiplexer lines, the detection circuit and the protection circuit; wherein the detection circuit and the protection circuit are disposed on a same area, the detection control line of the detection circuit is connected to the scan line by a thin-film transistor, making the protection circuit share the thin-film transistors with the detection circuit.

Figure 1:
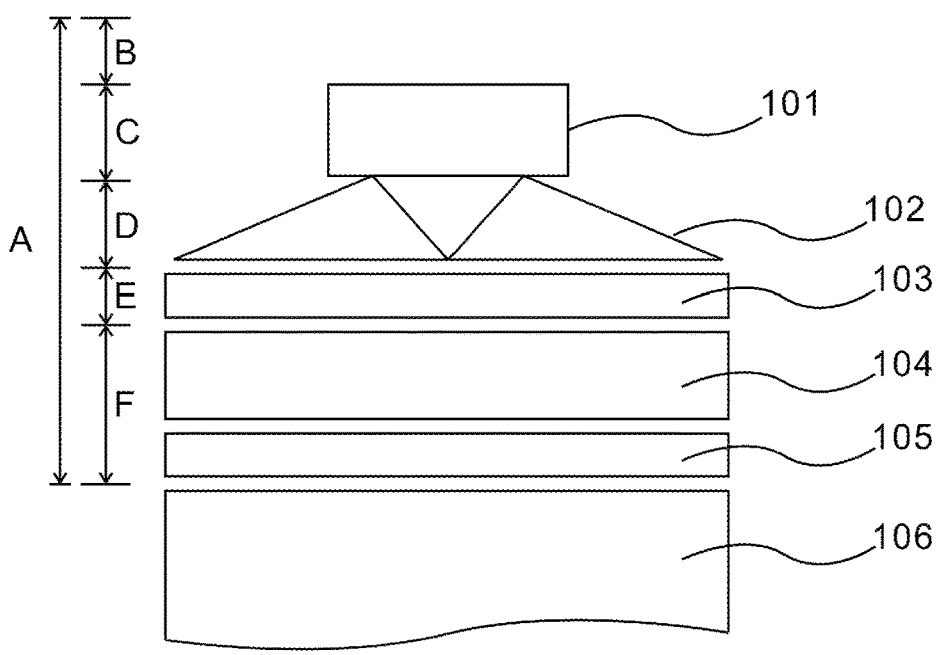
FIG. 1 is a bottom border structural schematic diagram of existing liquid crystal display panel.
Figure 2:
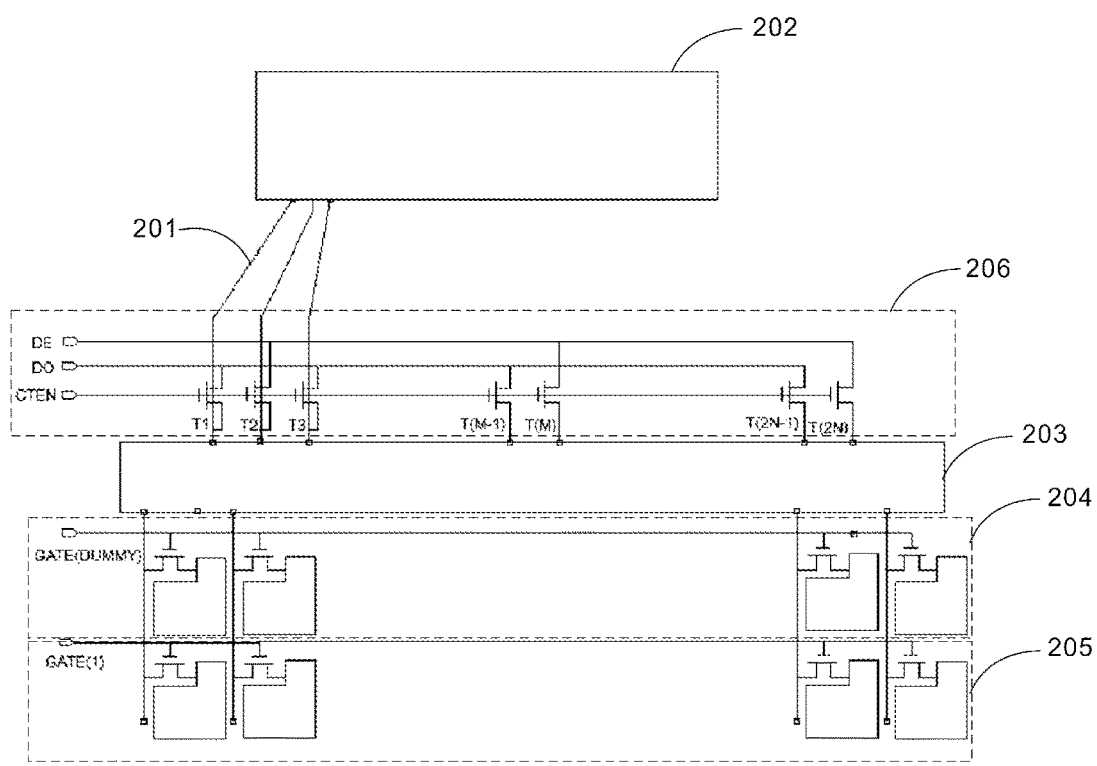
FIG. 2 is a detection circuit diagram of existing liquid crystal display panel.
Figure 3:
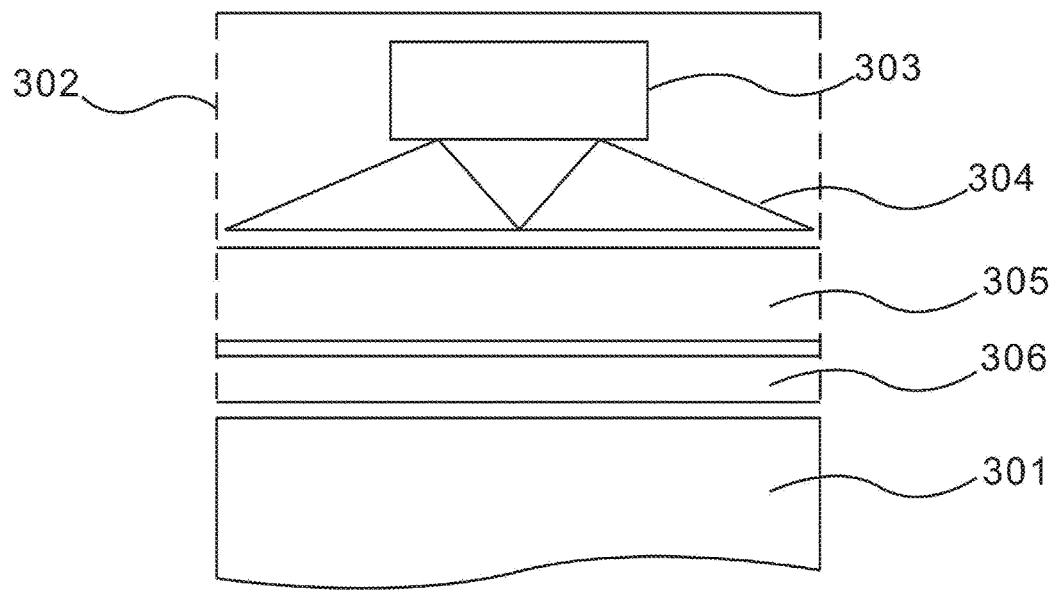
FIG. 3 is an edge area structural schematic diagram of liquid crystal display pane according to the present disclosure.

As shown in FIG. 3, FIG. 3 is an edge area structural diagram of liquid crystal display panel according to the present disclosure.

As shown in FIG. 3, the liquid crystal display panel includes a display area 301 and non-display area 302, wherein the non-display area 302 is the area of the liquid crystal display panel except for the display area 301. A width of the bottom border of the liquid crystal display panel extends from a width from an inner border of the non-display area 302 to an outer border of the non-display area 302. Changing width of the drive unit allows for narrower borders of the liquid crystal display panel.

The non-display area 302, divided into a first area, a second area, a third area and a fourth area from the outer border of the non-display area 302 to the inner border of the non-display area 302, is used to dispose the drive unit. The first area is used to dispose the driver chip 303, the second area is used to dispose the fan-out line 304, the third area is used to dispose the multiplexer line 305, and the fourth area is used to dispose an integrated circuit 306 comprising the detection circuit and the protection circuit. Disposing the detection circuit and the protection circuit on a same area saves an area.

An input end of the fan-out line 304 is connected to the driver chip 303, an output end of the fan-out line 304 is connected to the multiplexer line 305. The multiplexer line 305 is connected to the integrated circuit 306 comprising the detection circuit and the protection circuit. The integrated circuit 306 is connected to the display area 301.

Figure 4:
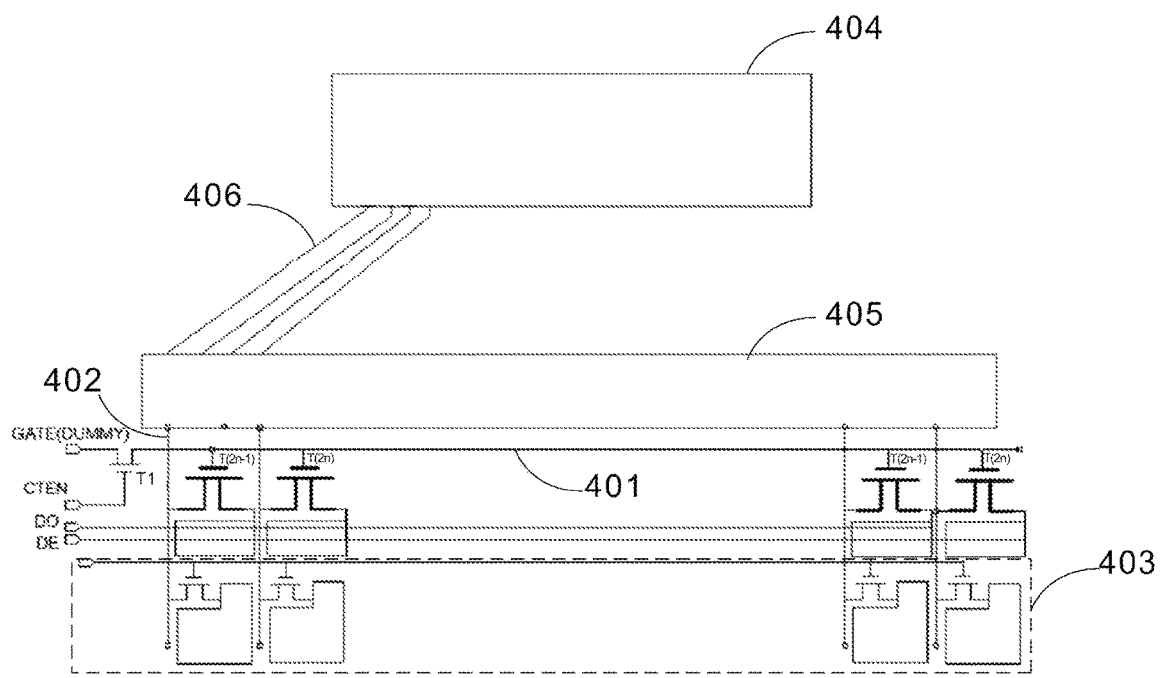
FIG. 4 is an integrated circuit diagram according to the present disclosure, where the integrated circuit combines a detection circuit with a protection circuit.

As shown in FIG. 4, FIG. 4 is an integrated circuit diagram according to the present disclosure, where the integrated circuit comprises a detection circuit and a protection circuit.

As shown in FIG. 4, the integrated circuit, comprising a detection circuit and a protection circuit, includes a first detection signal line DO, a second detection signal line DE, a detection signal line CTEN, a scan line 401 and a plurality of data lines 402. The data line 402 is leading out from an area where the multiplexer line 405 is arranged, and extending to the display 403 to connect to corresponding pixels.

A signal input end of the scan line 401 is connected to a first thin-film transistor T1 used to control the detection circuit on and off. The scan line is connected parallel to a plurality of second thin-film transistors used to push detection signal to pixel electrode. And the data line 402 transfers the detection signal to the pixels testing. The second thin-film transistor, not used for displaying picture, can protect the panel from static electricity.

A gate electrode of the first thin-film transistor is connected to the detection control line CTEN. A source electrode of the first thin-film transistor is connected to the scan line GATE (DUMMY). A drain electrode of the first thin-film transistor is connected to the scan line 401.

A gate electrode of the second thin-film transistor is connected to the scan line 401. A source electrode of the (2n−1)th second thin-film transistor is connected to the first detection signal line DO. A source electrode of the (2n−1)th second thin-film transistor is connected to the second detection signal line DE. The n is a positive integer. A drain electrode of the second thin-film transistor is connected to the corresponding data line 402.

When testing the panel, input a high level signal to the detection control line to turn on the first thin-film transistor. Input a high level signal to the scan line to turn on the second thin-film transistor. Input a detection signal to a pixel electrode connected to the second thin-film transistor by the first detection control line DO, and transfer the detection signal to the corresponding data line 402 by a drain electrode of the (2n–1)th second thin-film transistor to charge a connected pixel. Input a detection signal to a pixel electrode connected to the (2n)th second thin-film transistor by the second detection signal line DE, and transfer the detection signal to the corresponding data line 402 by a drain electrode of the (2n–1)th second thin-film transistor to charge a connected pixel, detecting display quality of the panel.

When testing the panel, an input voltage V1 of the detection control line is greater than a sum of a scan signal GATE(DUMMY) voltage V2 and a threshold voltage Vth of the first thin-film transistor.

In order to guarantee a charge power of the detection line during the panel testing, make a channel's length of the second thin transistor greater than a channel's length of normal thin-film transistor, and make a channel's width of the second thin transistor greater than a channel's width of normal thin-film transistor.

After testing the panel, bond the driver chip 404 to the liquid crystal display panel qualified. A first end of the fan-out line 406 is connected to an output pin of the driver chip 404 bonding to a corresponding area of the non-display area. A second end of the fan-out line 406 is connected to the multiplexer line 405. The detection control line CTEN is turned on. The first thin-film transistor T1 and the second thin-film transistor T2 are turned off. The liquid crystal display panel switches from a test status to a normal display status. The driver chip 404 charges each pixel by the data line 402 to show normal picture.

The present disclosure also provides a liquid crystal display device comprising a liquid crystal display panel; a backlight module, arranged opposite to the liquid crystal display panel, providing backlight for the liquid crystal display panel. The liquid crystal display panel comprises a display area and a non-display area around the display area, a drive unit is disposed on the non-display area; the drive unit comprising: a driver chip configured to input a voltage to a plurality of pixels; a plurality of fan-out lines, leading out from an output end of the driver chip, and extending to the display area to connect to data lines connected to each pixel, configured to transfer drive voltages; a plurality of multiplexer lines, each of the multiplexer lines connected to the fan-out lines, and configured to turn the fan-out lines on and off; a detection circuit comprising at least one detection signal line and one detection control line, the detecting circuit configured to detect a drive circuit of the liquid crystal display panel; the detection control line connected to a plurality of thin-film transistors; a protection circuit arranged close to the display area, the protection circuit configured to prevent static electricity of the liquid crystal panel, the protection circuit comprising a scan line connected to a plurality of thin-film transistors; An area of the non-display area is divided into a plurality of areas along a width direction of the non-display area to set the driver chip, the fan-out lines, the multiplexer lines, the detection circuit and the protection circuit; The detection circuit and the protection circuit are disposed on a same area, saving an area that the drive unit occupies in the non-display area, and narrowing borders of the liquid crystal display panel.

A work principle of the liquid crystal display device of the present preferred embodiment is the same with the liquid crystal display panel of the liquid crystal display panel of the preferred embodiment above. The work principle of the liquid crystal display device can be specifically described with reference to the work principle of the liquid crystal display panel of the above preferred embodiment described, and will not be described here.

The present disclosure has the beneficial effects as follows: compared with the prior art, the present disclosure combines the detection circuit with the protection circuit and dispose them in a same area, reducing the width of the non-display area, realizing narrow borders of the liquid crystal display panel.

The present disclosure is described in detail in accordance with the above contents with the specific preferred examples. However, this present disclosure is not limited to the specific examples. For a person of ordinary skill in the art, on the premise of keeping the conception of the present disclosure, the technical personnel can also make simple deductions or replacements, all of which should be considered to belong to the protection scope of the present disclosure.

What is claimed is:

1. A liquid crystal display panel, wherein the liquid crystal display panel comprises a display area and a non-display area around the display area, a drive unit is disposed on the non-display area, and the drive unit is disposed on an underside of the display area, the drive unit comprising:
    a driver chip configured to input a voltage to a plurality of pixels;
    a plurality of fan-out lines, leading out from an output end of the driver chip, and extending to the display area to connect to data lines connected to each pixel, configured to transfer drive voltages;
    a plurality of multiplexer lines, each of the multiplexer lines connected to the fan-out lines, and configured to turn the fan-out lines on and off;
    a detection circuit comprising at least one detection signal line and one detection control line, the detecting circuit configured to detect a drive circuit of the liquid crystal display panel; the detection control line connected to a plurality of thin-film transistors;
    a protection circuit arranged close to the display area, the protection circuit configured to prevent static electricity of the liquid crystal panel, the protection circuit comprising a scan line connected to a plurality of thin-film transistors;
    wherein an area of the non-display area is divided into a plurality of areas along a width direction of the non-display area to set the driver chip, the fan-out lines, the multiplexer lines, the detection circuit and the protection circuit;
    wherein the detection circuit and the protection circuit are disposed on a same area, the detection control line of the detection circuit is connected to the scan line by a thin-film transistor of the protection circuit, making the protection circuit share the thin-film transistors with the detection circuit;
    wherein an area between an outer border of the non-display area to an inner border of the non-display area is divided into a first area, a second area, a third area and a fourth area;
    wherein a first detection signal line, a second detection signal line, a detection control line, a scan line and a plurality of data lines are disposed on the fourth area, the data lines lead out from the third area, and extend to the display area to connect to a corresponding pixel;

wherein a signal input end of the scan line is connected to a first thin-film transistor, a gate electrode of the first thin-film transistor is connected to the detection control line, a source electrode of the first thin-film transistor receives a scan signal; a drain electrode of the first thin-film transistor is connected to the scan line;

wherein the scan line is connected to a plurality of second thin-film transistors, a gate electrode of the second thin-film transistor is connected to the scan line, a source electrode of the (2n−1)th second thin-film transistor is connected to the first detection signal line, a source electrode of the (2n)th second thin-film transistor is connected to the second detection signal line, wherein n is a positive integer, a drain electrode of the second thin-film transistor is connected to the corresponding data line.

2. The liquid crystal display panel as claimed in claim 1, wherein the driver chip is disposed on the first area, the fan-out lines are disposed on the second area, the multiplexer lines are disposed on the third area, the detection circuit and the protection circuit are disposed on the fourth area;

wherein the first area is arranged close to the edge of the non-display area, and the fourth area is arranged close to the edge of the display area.

3. The liquid crystal display panel as claimed in claim 2, wherein a length-width ratio of a channel of the second thin transistor is greater than a length-width ratio of a channel of thin-film transistor in the display area.

4. The liquid crystal display panel as claimed in claim 2, wherein when testing the panel, an input voltage V1 of the detection control line is greater than a sum of a scan signal voltage V2 and a threshold voltage Vth of the first thin-film transistor.

5. A liquid crystal display panel, wherein the liquid crystal display panel comprises a display area and a non-display area around the display area, a drive unit is disposed on the non-display area;

the drive unit comprising:

a driver chip configured to input a voltage to a plurality of pixels;

a plurality of fan-out lines, leading out from an output end of the driver chip, and extending to the display area to connect to data lines connected to each pixel, configured to transfer drive voltages;

a plurality of multiplexer lines, each of the multiplexer lines connected to the fan-out lines, and configured to turn the fan-out lines on and off;

a detection circuit comprising at least one detection signal line and one detection control line, the detecting circuit configured to detect a drive circuit of the liquid crystal display panel; the detection control line connected to a plurality of thin-film transistors;

a protection circuit arranged close to the display area, the protection circuit configured to prevent static electricity of the liquid crystal panel, the protection circuit comprising a scan line connected to a plurality of thin-film transistors;

wherein an area of the non-display area is divided into a plurality of areas along a width direction of the non-display area to set the driver chip, the fan-out lines, the multiplexer lines, the detection circuit and the protection circuit;

wherein the detection circuit and the protection circuit are disposed on a same area, the detection control line of the detection circuit is connected to the scan line by a thin-film transistor, making the protection circuit share the thin-film transistors with the detection circuit;

wherein an area between an outer border of the non-display area to an inner border of the non-display area is divided into a first area, a second area, a third area and a fourth area;

wherein a first detection signal line, a second detection signal line, a detection control line, a scan line and a plurality of data lines are disposed on the fourth area, the data lines lead out from the third area, and extend to the display area to connect to a corresponding pixel;

wherein a signal input end of the scan line is connected to a first thin-film transistor, a gate electrode of the first thin-film transistor is connected to the detection control line, a source electrode of the first thin-film transistor receives a scan signal; a drain electrode of the first thin-film transistor is connected to the scan line;

wherein the scan line is connected to a plurality of second thin-film transistors, a gate electrode of the second thin-film transistor is connected to the scan line, a source electrode of the (2n−1)th second thin-film transistor is connected to the first detection signal line, a source electrode of the (2n)th second thin-film transistor is connected to the second detection signal line, wherein n is a positive integer, a drain electrode of the second thin-film transistor is connected to the corresponding data line.

6. The liquid crystal display panel as claimed in claim 5, wherein the driver chip is disposed on the first area, the fan-out lines are disposed on the second area, the multiplexer lines are disposed on the third area, the detection circuit and the protection circuit are disposed on the fourth area;

wherein the first area is arranged close to the edge of the non-display area, and the fourth area is arranged close to the edge of the display area.

7. The liquid crystal display panel as claimed in claim 6, wherein a length-width ratio of a channel of the second thin transistor is greater than a length-width ratio of a channel of thin-film transistor in the display area.

8. The liquid crystal display panel as claimed in claim 6, wherein when testing the panel, an input voltage VI of the detection control line is greater than a sum of a scan signal voltage V2 and a threshold voltage Vth of the first thin transistor.

9. A liquid crystal display device, comprising:

a liquid crystal display panel;

a backlight module, arranged opposite to the liquid crystal display panel, providing backlight for the liquid crystal display panel;

wherein the liquid crystal display panel comprises a display area and a non-display area around the display area, a drive unit is disposed on the non-display area;

the drive unit comprising:

a driver chip configured to input a voltage to a plurality of pixels;

a plurality of fan-out lines, leading out from an output end of the driver chip, and extending to the display area to connect to data lines connected to each pixel, configured to transfer drive voltages;

a plurality of multiplexer lines, each of the multiplexer lines connected to the fan-out lines, and configured to turn the fan-out lines on and off;

a detection circuit comprising at least one detection signal line and one detection control line, the detecting circuit configured to detect a drive circuit of the liquid crystal display panel; the detection control line connected to a plurality of thin-film transistors;

a protection circuit arranged close to the display area, the protection circuit configured to prevent static electricity of the liquid crystal panel, the protection circuit comprising a scan line connected to a plurality of thin-film transistors;

wherein an area of the non-display area is divided into a plurality of areas along a width direction of the non-display area to set the driver chip, the fan-out lines, the multiplexer lines, the detection circuit and the protection circuit;

wherein the detection circuit and the protection circuit are disposed on a same area, the detection control line of the detection circuit is connected to the scan line by a thin-film transistor, making the protection circuit share the thin-film transistors with the detection circuit;

wherein an area between an outer border of the non-display area to an inner border of the non-display area is divided into a first area, a second area, a third area and a fourth area;

wherein a first detection signal line, a second detection signal line, a detection control line, a scan line and a plurality of data lines are disposed on the fourth area, the data lines lead out from the third area, and extend to the display area to connect to a corresponding pixel;

wherein a signal input end of the scan line is connected to a first thin-film transistor, a gate electrode of the first thin-film transistor is connected to the detection control line, a source electrode of the first thin-film transistor receives a scan signal; a drain electrode of the first thin-film transistor is connected to the scan line;

wherein the scan line is connected to a plurality of second thin-film transistors, a gate electrode of the second thin-film transistor is connected to the scan line, a source electrode of the (2n−1)th second thin-film transistor is connected to the first detection signal line, a source electrode of the (2n)th second thin-film transistor is connected to the second detection signal line, wherein n is a positive integer, a drain electrode of the second thin-film transistor is connected to the corresponding data line.

10. The liquid crystal display device as claimed in claim 9, wherein the driver chip is disposed on the first area, the fan-out lines are disposed on the second area, the multiplexer lines are disposed on the third area, the detection circuit and the protection circuit are disposed on the fourth area;

wherein the first area is arranged close to the edge of the non-display area, and the fourth area is arranged close to the edge of the display area.

11. The liquid crystal display device as claimed in claim 10, wherein a length-width ratio of a channel of the second thin transistor is greater than a length-width ratio of a channel of thin-film transistor in the display area.

* * * * *